US010936326B2

(12) United States Patent
Castillo et al.

(10) Patent No.: US 10,936,326 B2
(45) Date of Patent: Mar. 2, 2021

(54) AUTOMATED BIOS PLATFORM CONFIGURATION SYSTEM

(71) Applicant: Dell Products L.P., Round Rock, TX (US)

(72) Inventors: Fernando Antonio Garcia Castillo, Round Rock, TX (US); Wei G. Liu, Austin, TX (US); Alberto David Perez Guevara, Pflugerville, TX (US); Mark W. Shutt, Austin, TX (US); Benjamin Andrew Martinez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 110 days.

(21) Appl. No.: 16/362,160

(22) Filed: Mar. 22, 2019

(65) Prior Publication Data
US 2020/0301719 A1    Sep. 24, 2020

(51) Int. Cl.
*G06F 9/44*       (2018.01)
*G06F 9/4401*   (2018.01)

(52) U.S. Cl.
CPC .......... *G06F 9/4403* (2013.01); *G06F 9/4411* (2013.01)

(58) Field of Classification Search
CPC .............................. G06F 9/4403; G06F 9/4411
See application file for complete search history.

(56) References Cited

U.S. PATENT DOCUMENTS

| | | | |
|---|---|---|---|
| 6,421,069 B1 | 7/2002 | Ludtke et al. | |
| 6,629,192 B1 * | 9/2003 | Schaefer | G06F 9/4401 711/103 |
| 2004/0193706 A1 * | 9/2004 | Willoughby | G06F 15/177 709/223 |

* cited by examiner

*Primary Examiner* — Stefan Stoynov
(74) *Attorney, Agent, or Firm* — Haynes and Boone, LLP

(57) ABSTRACT

A BIOS platform configuration system includes a BIOS coupled to hardware subsystems. During initialization operations, the BIOS communicates with each of the hardware subsystems and retrieves respective hardware subsystem information that is associated with each of the hardware subsystems and that describes at least a portion of a communication route between that hardware subsystem and at least one other hardware subsystem. The BIOS then combines the respective hardware subsystem information that is associated with each of the hardware subsystems to generate configuration information that describes complete communication routes between each of the hardware subsystems, and configures at least one of the hardware subsystems using the configuration information. In a specific example, the configuration information may provide a processing subsystem/chipset initialization table that is used initialize a processing subsystem/chipset in order to allow it to communicate with a device connected to a planar subsystem/motherboard that includes the processing system/chipset.

20 Claims, 4 Drawing Sheets

AUTOMATED BIOS PLATFORM CONFIGURATION SYSTEM

BACKGROUND

The present disclosure relates generally to information handling systems, and more particularly to automating the configuration of an information handling system via its Basic Input Output System (BIOS).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often provided as part of a computing platform that supports particular hardware and software configurations. For example, server devices typically include hardware such as planar systems (e.g., backplanes, motherboards, and/or other planar systems known in the art), processing systems (e.g., Central Processing Units (CPUs), chipsets, and/or other processing systems known in the art), and devices (e.g., storage devices, Network Interface Controllers (NICs), embedded devices, and/or other devices known in the art) that must be configured by the Basic Input Output System (BIOS) in that server device during its initialization. In conventional BIOS platform configuration systems, a BIOS image that provides the BIOS in the server device was previously generated in order to support the particular hardware configurations that will be available to that server device. For example, server device manufacturers typically utilize proprietary configuration protocols to create static configuration tables that are then hard-coded in the BIOS for use during initialization of the server device to configure its hardware and/or software. The static nature of those configuration tables prevents the modification of the hardware configuration in the server device (e.g., via the provisioning of new/different planar systems, processing systems, and/or devices) without the associated programming/coding/generating of a new BIOS image/BIOS block that provides a BIOS that supports that new hardware configuration, and the installing of that new BIOS image/BIOS block on the computing device. The generation and/or modification of such configuration tables is a manual and time-consuming process that must consider and implement all possible configurations that will be supported in the server device, and the need to install a new BIOS image to provide a BIOS that supports new hardware is inconvenient for the user of the server device.

Accordingly, it would be desirable to provide an improved BIOS platform configuration system.

SUMMARY

According to one embodiment, an Information Handling System (IHS) includes a Basic Input Output System (BIOS) processing system; and a BIOS memory system that is coupled to the BIOS processing system and that includes instructions that, when executed by the BIOS processing system, cause the BIOS processing system to provide a BIOS engine that is configured, during initialization operations, to: communicate with each of a plurality of hardware subsystems; retrieve, in response to the communications with each of the plurality of hardware subsystems, respective hardware subsystem information that is associated with each of the plurality of hardware subsystems and that describes at least a portion of a communication route between that hardware subsystem and at least one other hardware subsystem; combine the respective hardware subsystem information that is associated with each of the plurality of hardware subsystems to generate configuration information that describes complete communication routes between each of the plurality of hardware subsystems; and configure at least one of the plurality of hardware subsystems using the configuration information.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
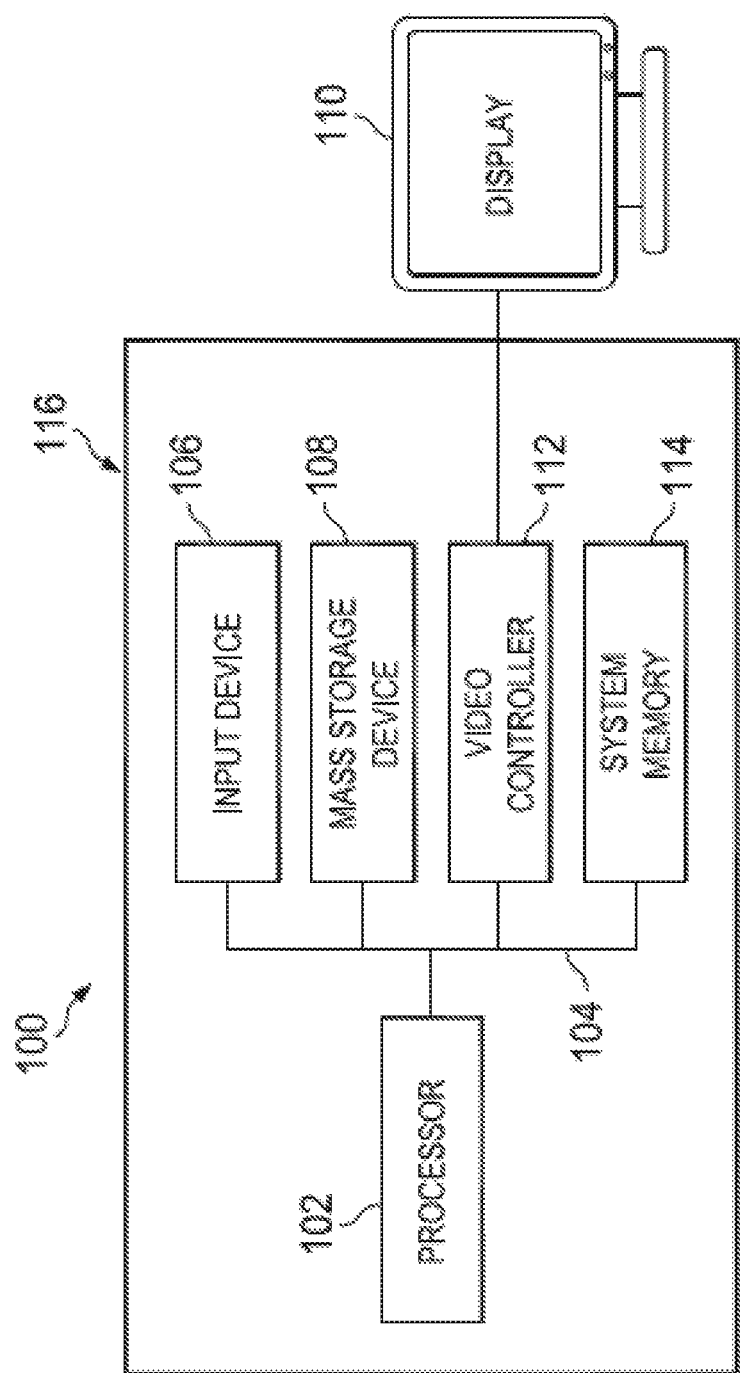
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
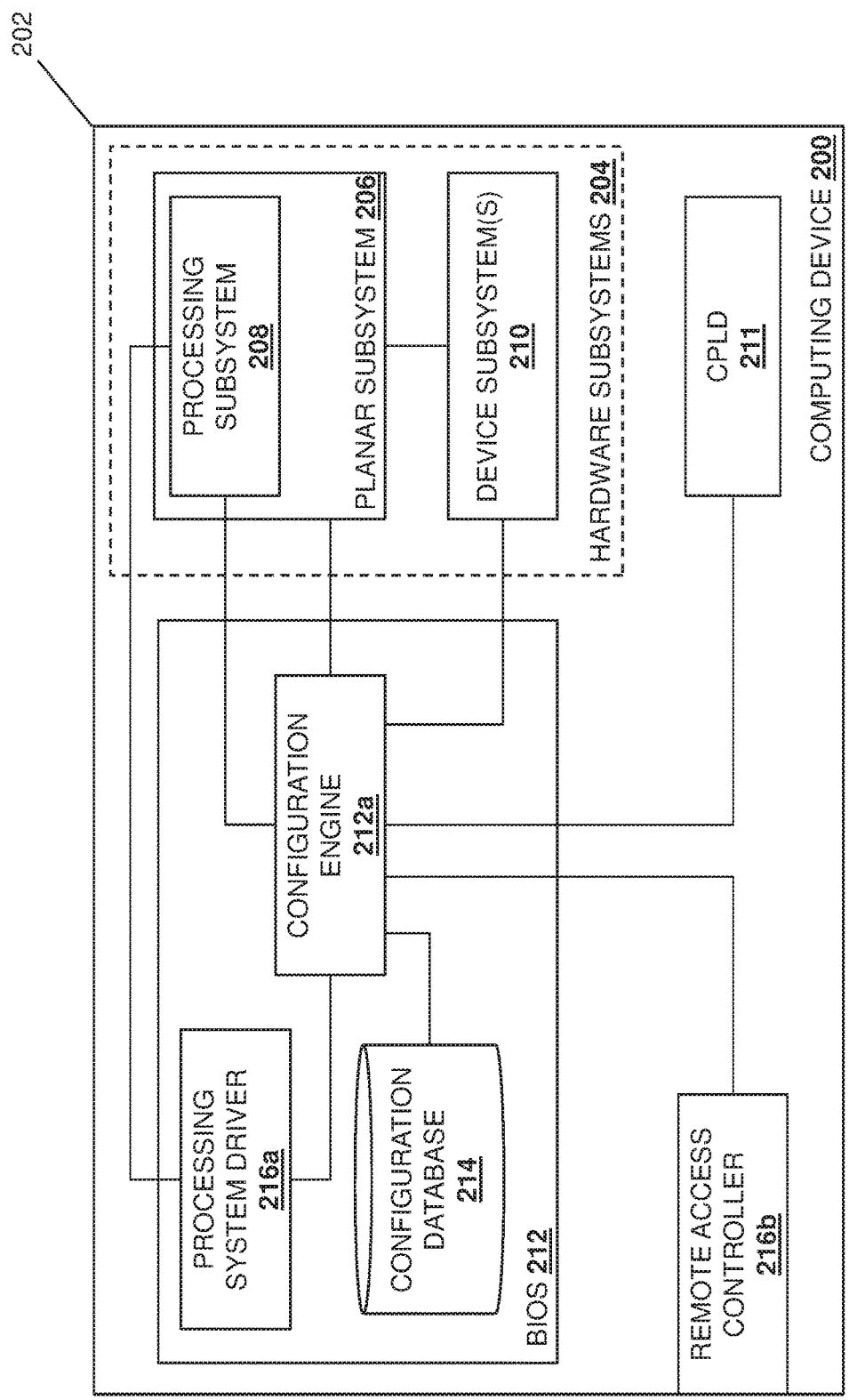
FIG. 2 is a schematic view illustrating an embodiment of a computing device that includes the BIOS platform configuration system of the present disclosure.

Referring now to FIG. 2, an embodiment of a computing device 200 is illustrated that may provide the Basic Input Output System (BIOS) platform configuration system of the present disclosure. In an embodiment, the computing device 200 may be provided by the IHS 100 discussed above with reference to FIG. 1 and/or may include some or all of the components of the IHS 100. Furthermore, while illustrated and discussed below as being provided in a server device, one of skill in the art in possession of the present disclosure will recognize that the BIOS platform configuration functionality of the computing device 200 discussed below may be provided in networking devices (e.g., switch devices), desktop computing devices, laptop/notebook computing devices, tablet computing devices, mobile phones, and/or any other computing device that is configured to operate similarly as discussed below. In the illustrated embodiment, the computing device 200 includes a chassis 202 that houses the components of the computing device 200, only some of which are illustrated below.

For example, the chassis 202 houses a plurality of hardware subsystems 204 that, in the illustrated embodiment, include a planar subsystem 206 that may be provided by a backplane, a motherboard, and/or a variety of other planar subsystems that would be apparent to one of skill in the art in possession of the present disclosure. Furthermore, the hardware subsystems 204 also include a processing subsystem 208 may be mounted on the planar subsystem 206, and that may be provided by one or more Central Processing Units (CPUs), chipsets, and/or a variety of other processing subsystems that would be apparent to one of skill in the art in possession of the present disclosure. Further still, the hardware subsystems 204 also include one or more device subsystems 210 that may be mounted and/or coupled to the planar subsystem 206 (and the processing subsystem 208 via the planar subsystem), and that may include storage devices (e.g., hard drives, solid state drives, etc.), Network Interface Controllers (NICs), embedded devices (e.g., Particle Circuit Board (PCB) devices), external devices, and/or a variety of other devices that would be apparent to one of skill in the art in possession of the present disclosure. While a few specific hardware subsystems have been illustrated and described, one of skill in the art in possession of the present disclosure will recognize that any of a variety of hardware subsystems may be utilized with the BIOS platform configuration system of the present disclosure depending on the computing device implementation, and those hardware subsystems will fall within the scope of the present disclosure as well. The chassis 202 may also house a Complex Programmable Logic Device (CPLD) 211 that, as discussed below, may be configured to report platform-specific information upon initialization of the computing device 200.

The chassis 202 may also house a BIOS processing system (not illustrated, but which may include the processor 102 discussed above with reference to FIG. 1 and/or processing components with similar functionality) and a BIOS memory system (not illustrated, but which may include the memory 114 discussed above with reference to FIG. 1, and/or memory components with similar functionality) that is coupled to the BIOS processing system and that includes instructions that, when executed by the BIOS processing system, cause the BIOS processing system to provide a BIOS engine that is configured to perform the functionality of a BIOS 212 discussed below. One of skill in the art in possession of the present disclosure will recognize that, in addition to performing the functionality discussed below, the BIOS 212 may include non-volatile firmware that is configured to perform hardware initialization during a booting process for the computing device 200, as well as provide runtime services for an operating system and/or other programs provided on the computing system 200. As would be understood by one of skill in the art in possession of the present disclosure, the BIOS 212 may be provided as a Unified Extensible Firmware Interface (UEFI) BIOS. Thus, while UEFI is known in the art as a specification that has been provided to replace the conventional BIOS, and that defines a software interface between an operating system and platform firmware provided on computing devices, the discussions of the BIOS functionality below are intended to encompass UEFI BIOS functionality as well (i.e., a UEFI BIOS may provide the BIOS 212 that performs the functionality discussed below while remaining within the scope of the present disclosure.)

In the illustrated embodiment, the BIOS 212 provides a configuration engine 212a that is configured to perform the functions of the configuration engines and BIOS discussed below. For example, the BIOS memory system discussed above may include instructions that, when executed by the BIOS processing system, cause the BIOS processing system to provide the configuration engine 212a. The configuration engine 212a is coupled to each of the hardware subsystems 204 (e.g., the planar subsystem 206, the processing subsystem 208, and the device subsystem(s) 210) via, for example, couplings between those hardware subsystems and the BIOS processing system. As would be recognized by one of skill in the art in possession of the present disclosure, in some examples the BIOS 212 may be provided by components that are mounted to the planar subsystem 206, and thus the couplings between the BIOS 212 and the hardware subsystems 204 may be enabled, at least in part, by the couplings (e.g., traces) on the planar subsystem 206.

In the illustrated embodiment, the BIOS 212 may also include a BIOS storage system (e.g., the BIOS memory system and/or a separate BIOS storage system) that is coupled to the configuration engine 212a (e.g., via a coupling between the BIOS storage system and the BIOS processing system) and that may include a configuration database 214 that is configured to store any of the information utilized by the configuration engine 212a as discussed below. However, one of skill in the art in possession of the present disclosure will recognize that, in some embodiments, the configuration database 214 may be provided outside the BIOS 212 while remaining within the scope of the present disclosure as well. The chassis 202 may also house one or more configuration information consumer subsystems that are configured to utilize the configuration information generated by the configuration engine 212a as discussed below. For example, the processing system driver 216a illustrated in FIG. 2 provides an example of a configuration information consumer subsystem that is included in the BIOS 212, that is coupled to the processing subsystem 208 (e.g., via a coupling between the BIOS processing system and the processing system 208), and that may be provided by instructions on the BIOS memory system that, when executed by the BIOS processing system, cause the BIOS processing system to provide the processing system driver 216a. Furthermore, the remote access controller 216b illustrated in FIG. 2 provides an example of a configuration information consumer subsystem that is located outside of the BIOS 212, and that may be provided by a integrated DELL® Remote Access Controller (iDRAC) available from DELL® Inc. of Round Rock, Tex., United States, a Baseboard Management Controller (BMC), and/or other remote access controllers that would be apparent to one of skill in the art in possession of the present disclosure. While a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
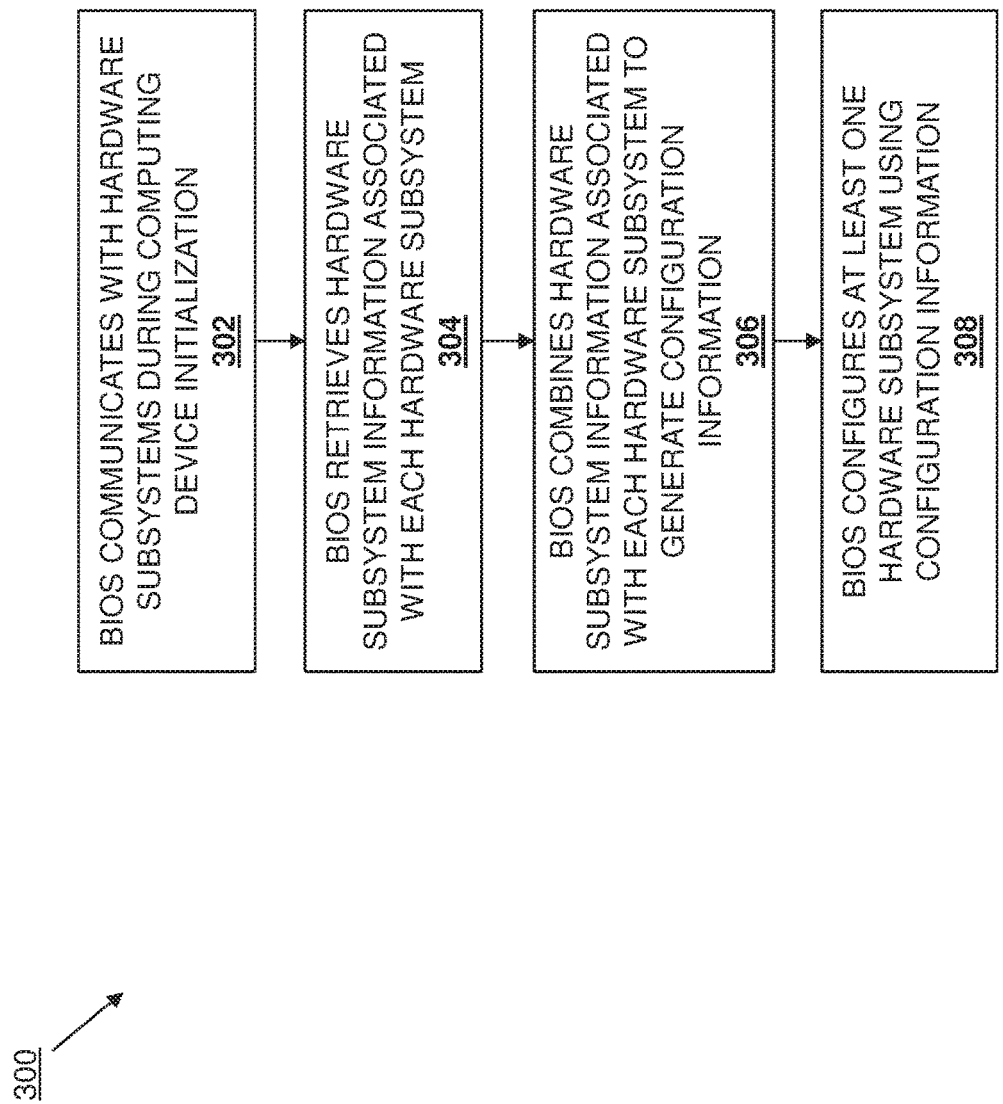
FIG. 3 is a flow chart illustrating an embodiment of a method for BIOS platform configuration.

Referring now to FIG. 3, an embodiment of a method 300 for BIOS platform configuration is illustrated. As discussed below, the systems and methods of the present disclosure provide an automated, flexible, and dynamic technique for generating configuration information for use in configuring hardware subsystems in a computing device. In some embodiments, during initialization of the computing device, the BIOS in the computing device dynamically discovers the hardware subsystems in that computing device in response to communications enabled via, for example, platform information provided to the BIOS by a CPLD in the computing device. The BIOS may then operate to retrieve hardware subsystem information associated with each of the hardware subsystems via the communication of that hardware subsystem information directly by hardware subsystems that are configured to self-report/describe that hardware subsystem information about themselves, the identification of those hardware subsystems and the retrieval of their associated hardware subsystem information from a database, and/or combinations thereof. The hardware subsystem information retrieved for each of the hardware subsystems describes at least a portion of a communication route between that hardware subsystem and at least one other hardware subsystem, and the BIOS may operate to generate configuration information by "stitching" or otherwise combining that hardware subsystem information in such as way that generates the configuration information that describes complete communication routes between each of the hardware subsystems. The BIOS may then utilize the configuration information to configure at least one of the hardware subsystems.

The systems and methods of the present disclosure enhance the ability to reuse hardware subsystems, increase the potential hardware configurations possible with any particular BIOS/BIOS image, enable the adoption of new and/or different hardware subsystems without the need to update the BIOS/BIOS image, provide the ability to modularize hardware subsystems for easy reuse across multiple computing device platforms via the support of a "plug-and-play" model, reduce the initialization times for computing device platforms (e.g., by decreasing the time needed to enumerate and name hardware subsystems such as devices), and introduce a variety of other benefits that will be apparent to one of skill in the art in possession of the present disclosure.

The method 300 begins at block 302 where a BIOS communicates with hardware subsystems during computing device initialization. In an embodiment, at block 302, the computing device may be started up, reset, booted, and/or otherwise initialized and, in response, the configuration engine 212a in the BIOS 212 may operate to communicate with the hardware subsystems 204 in order to discover those hardware subsystems 204. For example, prior to block 302, the CPLD 210 may be configured with platform information that describes the computing device platform in which the computing device 200 belongs, and that may include a planar identification key, a planar revision identification, a device presence detection per connector information, cabling scheme information, power draw and distribution information, and/or a variety of other computing device platform information that would be apparent to one of skill in the art in possession of the present disclosure as providing any information about the platform and/or device connected to that platform that may be utilized for configuration and management of the system. As such, at block 302 and during the initialization of the computing device 200, the CPLD 211 may provide the platform information to the configuration engine 212a in the BIOS 212. The configuration engine 212a in the BIOS 212 may then utilize the platform information to communicate with and discover the hardware subsystems 204. As such, the configuration engine 212a in the BIOS 212 may communicate with and discover the planar subsystem 206 (e.g., a backplane, motherboard, etc.), the processing subsystem 208 (e.g., a CPU, chipset, etc.) on the planar subsystem 206, and the device subsystem(s) 204 (e.g., storage device(s), NIC(s), embedded devices, etc.) coupled to the planar subsystem 206.

The method 300 then proceeds to block 304 where the BIOS retrieves hardware subsystem information associated with each hardware subsystem. In an embodiment, at block 304, the configuration engine 212a in the BIOS 212 may operate to retrieve hardware subsystem information for each of the hardware subsystems 204, with that hardware subsystem information describing at least a portion of a communication route between that hardware subsystem and at least one other hardware subsystem. In some examples, one or more of the hardware subsystems 204 may be "self-reporting/describing" hardware subsystems that are configured to provide their hardware subsystem information to the configuration engine 212a in the BIOS 212 via the communications at block 302. In other examples, one or more of the hardware subsystems 204 may not include the "self-reporting/describing" hardware subsystem functionality discussed above, and the configuration engine 212a in the BIOS 212 may identify those hardware subsystems via the communications at block 302, and then use the identifications of those hardware subsystems to access the configuration database 214 and retrieve their associated hardware subsystem information. As such, prior to the method 300, hardware subsystem information for hardware subsystems that are not configured with the "self-reporting/describing" hardware subsystem functionality discussed above may be provided in the configuration database 214.

Thus, continuing with specific example of the illustrated embodiment, the planar subsystem 206 may not be configured with the "self-reporting/describing" hardware subsystem functionality discussed above, and the configuration engine 212a in the BIOS 212 may identify the planar subsystem 206 at block 302 (e.g., via the communication of a planar subsystem identifier by the planar subsystem 206 at block 302 that identifies the planar subsystem 206), and may retrieve planar subsystem information associated with the planar subsystem 206 from the configuration database 214 at block 304. In a specific example, planar subsystem information associated with the planar subsystem 206 may include the information illustrated in element 402 of FIG. 4 such as a connector identifier (e.g., 0, 1, 2, etc.), a connector type (e.g., slot connector type, bay connector type, a slimline connector type, etc.), a number of connectors (e.g., 4 connectors), mechanical information (e.g., chassis layout information such as height, width, length, etc.), a processor identifier (e.g., socket 1 processor, socket 2 processor, etc.), a port identifier (e.g., PCIe, SATA, etc.), lane reversal information (e.g., true or false), hotplug capability information (e.g., true or false), power draw information (e.g., 25 watts, 50 watts, etc.), and/or a variety of other planar subsystem information that would be apparent to one of skill in the art in possession of the present disclosure. As discussed above, the planar subsystem information may describe at least a portion of a communication route between the planar subsystem 206 and at least one of the processing system 208 and the device subsystem(s) 210.

Similarly, the processing subsystem 208 may not be configured with the "self-reporting/describing" hardware subsystem functionality discussed above, and the configuration engine 212a in the BIOS 212 may identify the processing subsystem 208 at block 302 (e.g., via the communication of a processing subsystem identifier by the processing subsystem 208 at block 302 that identifies the processing subsystem 208), and may retrieve processing subsystem information associated with the processing subsystem 208 from the configuration database 214 at block 304. In a specific example, processing subsystem information associated with the processing subsystem 208 may be similar to the planar subsystem information discussed above and may refer to the driver that is configured to collect, format, or handoff that information to the configuration engine in a particular format for processing, with that driver provided according to a UEFI PPI protocol and having functionality to retrieve the planar subsystem information, and/or a variety of other processing subsystem information that would be apparent to one of skill in the art in possession of the present disclosure. As discussed above, the processing subsystem information may describe at least a portion of a communication route between the processing subsystem 208 and the planar subsystem 206. However, while planar subsystems and processing subsystems without "self-reporting/describing" hardware subsystem functionality have been described, one of skill in the art in possession of the present disclosure will recognize that planar subsystems and processing subsystems with "self-reporting/describing" hardware subsystem functionality will fall within the scope of the present disclosure as well.

Similarly, in some embodiments at least one of the device subsystem(s) 210 may not be configured with the "self-reporting/describing" hardware subsystem functionality discussed above, and the configuration engine 212a in the BIOS 212 may identify those device subsystem(s) 210 at block 302 (e.g., via the communication of device subsystem identifier(s) by the device subsystem(s) 221 at block 302 that identifies the device subsystem(s) 210), and may retrieve device subsystem information associated with those device subsystem(s) 210 from the configuration database 214 at block 304. In a specific example, device subsystem information associated with the device subsystem(s) 210 may include the information illustrated in element 404 of FIG. 4 such as a connector identifier (e.g., 0, 1, 2, etc.), a connector type (e.g., slot connector type, bay connector type, a slimline connector type, etc.), a number of connectors (e.g., 4 connectors), mechanical information (e.g., chassis layout information such as height, width, length, etc.), a processor identifier (e.g., socket 1 processor, socket 2 processor, etc.), a port identifier (e.g., PCIe, SATA, etc.), lane reversal information (e.g., true or false), hotplug capability information (e.g., true or false), power draw information (e.g., 25 watts, 50 watts, etc.), and/or a variety of other device subsystem information that would be apparent to one of skill in the art in possession of the present disclosure. As discussed above, the device subsystem information may describe at least a portion of a communication route between the device subsystem 210 and the planar subsystem 206.

However, in some embodiments at least one of the device subsystem(s) 210 may be configured with the "self-reporting/describing" hardware subsystem functionality discussed above, and the configuration engine 212a in the BIOS 212 may communicate with the device subsystem(s) 210 at block 302 and retrieve device subsystem information associated with those device subsystem(s) 210 via those communications at block 304. As will be appreciated by one of skill in the art in possession of the present disclosure, software instructions/code in the BIOS 212 for supporting "self-reporting/describing" hardware subsystems is infrequently updated and not tied to computing device initialization and, as such, the enablement of the "self-reporting/describing" hardware subsystem functionality in the automated BIOS platform configuration system 200 of the present disclosure does not result in the need for regular BIOS updates. As such, the hardware subsystem information retrieved at block 304 may be hard-coded, static hardware subsystem information that is stored in the configuration database 214 and associated with particular hardware subsystems, and/or hardware subsystem information that is self-reported/described by hardware subsystems in the computing device 200.

The method then proceeds to block 306 where the BIOS combines the hardware subsystem information associated with each hardware subsystem to generate configuration information. In an embodiment, at block 306, the configuration engine 212a in the BIOS 212 may operate to "stitch" or otherwise combine the hardware subsystem information retrieved at block 304 in order to generate configuration information that describes complete communication routes between each of the plurality of hardware subsystems 204. Continuing with specific example of the illustrated embodiment, at block 306 the configuration engine 212a in the BIOS 212 may combine the planar subsystem information retrieved for the planar subsystem 206, the processing subsystem information retrieved for the processing subsystem 208, and the device subsystem information retrieved for the device subsystem(s) 210 in order to generate the configuration information that describes complete communication routes between each of the planar subsystem 206, the processing subsystem 208, and the device subsystem(s) 210.

In a specific example, such complete communication routes may include a communication route from an external device, through a coupling of the external device to the planar subsystem 206, through one or more traces on the planar subsystem 206, through a coupling of the processing system 208 to the planar subsystem 206, and to a root port on the processing system 208. In some embodiments, the configuration information may be provided in a configuration information table. For example, as discussed below, the configuration information may be chipset initialization information that is provided in a chipset initialization table that is configured to be utilized to initialize a chipset (e.g., provided by the processing system 208.)

Figure 4:
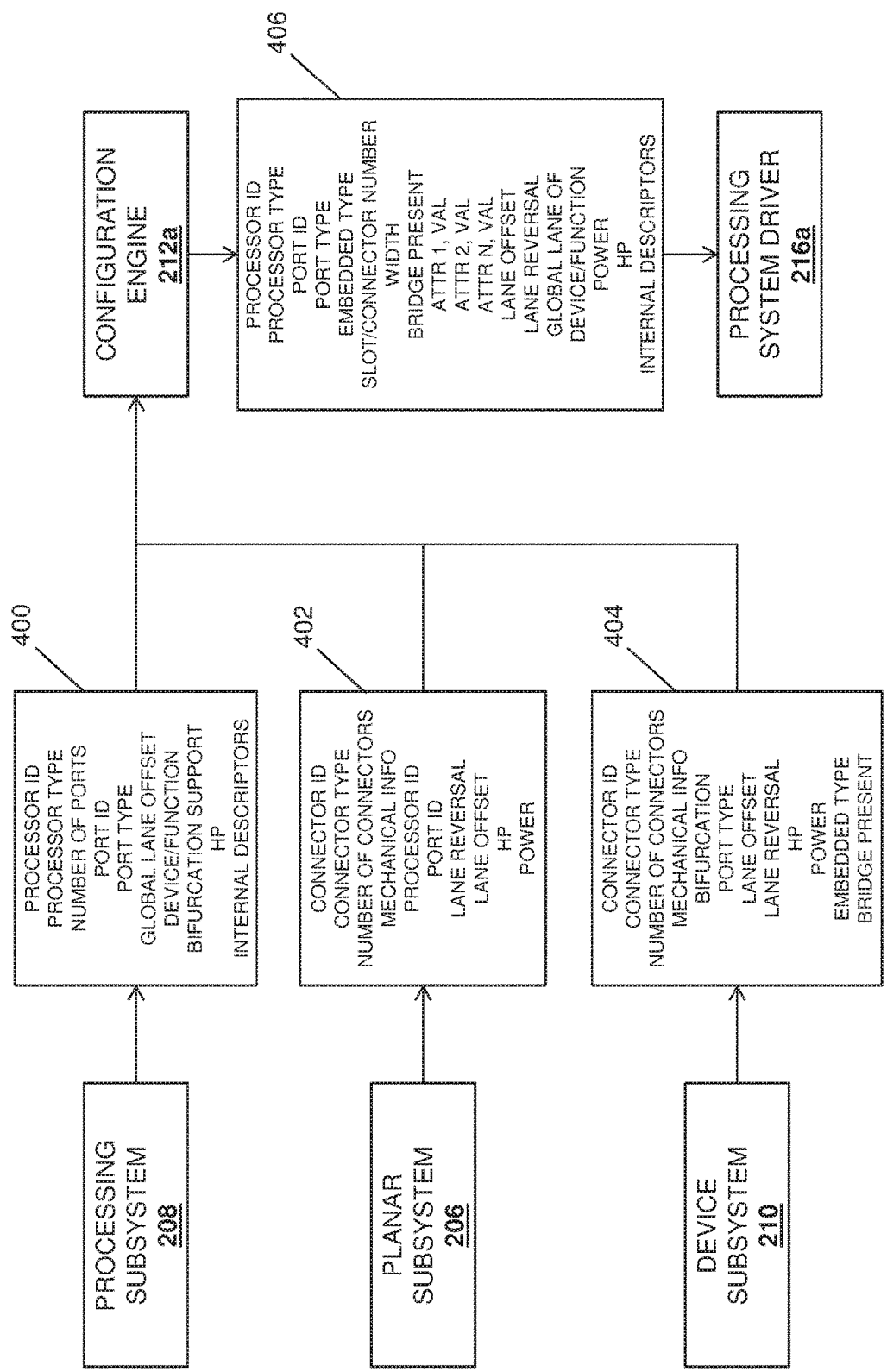
FIG. 4 is a schematic view illustrating an embodiment of the automated generation of a configuration table in the computing device of FIG. 2 during the method of FIG. 3.

With reference to FIG. 4, the configuration engine 212*a* is illustrated retrieving hardware subsystem information such as the processing subsystem information 400 from the processing subsystem 208, the planar subsystem information 402 from the planar subsystem 206, and the device subsystem information 404 from the device subsystem 210, and combining the processing subsystem information 400, planar subsystem information 402, and device subsystem information 404 to generate configuration information 406.

As discussed below, in some embodiments, the configuration information 406 may be generated by the configuration engine 212*a* in the BIOS 212 using a configuration information protocol that provides the configuration information 406 in a structure and/or format that may be utilized by conventional configuration information consumers in order to perform configuration operations. However, in other embodiments, the configuration information 406 may be generated by the configuration engine 212*a* in the BIOS 212 using a configuration information protocol that provides the configuration information 406 in a structure and/or format that may be utilized by configuration information consumers provided according to the teachings of the present disclosure in order to perform configuration operations, but that is not recognized by conventional configuration information consumers. In those embodiments, the configuration engine 212*a* in the BIOS 212 may then "repackage", convert, and/or otherwise modify the configuration information in order to provide it in a structure and/or format that allows its use by conventional configuration information consumers in performing configuration operations. In additional, if conventional configuration information (e.g., a conventional chipset initialization table) has been provided in the computing device 200, the configuration engine 212*a* in the BIOS 212 may be configured to override the use of that conventional configuration information in favor of the configuration information generated according to the method 300 (at least for the configuration of hardware subsystems that are capable of being configured via the configuration information generated according to the method 300.)

The method 300 proceeds to block 308 where the BIOS configures at least one hardware subsystem using the configuration information. In an embodiment, at block 308, the configuration engine 212*a* in the BIOS 212 may provide the configuration information generated at block 306 to the processing system driver 216*a*, as illustrated in FIG. 4, and the processing system driver 216*a* may utilize the configuration information to configure the processing system 208. In a specific example, the processing system driver 216*a* may be provided by a chipset initialization driver, and at block 308 the configuration engine 212*a* may provide the configuration information as a chipset initialization table to the chipset initialization driver for used in configuring a chipset provided by the processing subsystem 208. In another embodiment, at block 308, the configuration engine 212*a* in the BIOS 212 may provide the configuration information generated at block 306 to the remote access controller 216*b*, and the remote access controller 216*b* may utilize the configuration information to perform operations such as system inventory operations, error reporting operations, and/or other operations that one of skill in the art in possession of the present disclosure will recognize are outside the scope of the BIOS. While only two configuration information consumer subsystems (i.e., the processing system driver 216*a* and the remote access controller 216*b*) are illustrated and described herein, one of skill in the art in possession of the present disclosure will recognize that other configuration information consumer subsystems may utilize the configuration information in a similar manner. For example, an error subsystem in the BIOS 212 may utilize the configuration information in order to recognize errors such as, for example, errors resulting from unsupported hardware subsystems being provided in the computing device 200, as well as any other errors that would be apparent to one of skill in the art in possession of the present disclosure.

Thus, an embodiment of the systems and methods of the present disclosure have been described that provide an automated, flexible, and dynamic technique for generating chipset initialization tables for use in configuring chipsets in server devices. In some embodiments, during initialization of the server device, a UEFI BIOS in the server device dynamically discovers the chipset, motherboard, and embedded devices in that server device in response to communications enabled via, for example, platform information provided to the UEFI BIOS by a CPLD in the server device. The UEFI BIOS may then operate to retrieve chipset information, motherboard information, and embedded device information associated with each of the chipset, motherboard, and embedded devices via the communication of that information directly by embedded devices that are configured to self-report/describe that embedded device information about themselves, and the identification of chipset and the motherboard and the retrieval of their associated chipset information and motherboard information from a database. The chipset information, motherboard information, and embedded device information retrieved for each of the chipset, motherboard, and embedded devices describes at least a portion of a communication route between those hardware subsystems and at least one other hardware subsystems, and the UEFI BIOS may operate to generate chipset initialization table by "stitching" or otherwise combining that chipset information, motherboard information, and embedded device information in such as way that generates the chipset initialization table that describes complete communication routes between each of those hardware subsystems. A chipset initialization driver in the UEFI BIOS may then utilize the chipset initialization table to configure the chipset. The systems and methods of the present disclosure enhance the ability to reuse hardware subsystems, increase the potential hardware configurations possible with any particular UEFI BIOS/BIOS image, enable the adoption of new and/or different hardware subsystems without the need to update the UEFI BIOS/BIOS image, provide the ability to modularize hardware subsystems for easy reuse across multiple computing device platforms via the support of a "plug-and-play" model, reduce the initialization times for server device platforms (e.g., by decreasing the time needed to enumerate and name hardware subsystems such as devices), enable computing platforms and products to come to market quicker, and introduce a variety of other benefits that will be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Basic Input Output System (BIOS) platform configuration system, comprising:
   a plurality of hardware subsystems; and
   a Basic Input Output System (BIOS) that is coupled to the plurality of hardware subsystems, wherein the BIOS is configured, during initialization operations, to:
   communicate with each of the plurality of hardware subsystems;
   retrieve, in response to the communications with each of the plurality of hardware subsystems, respective hardware subsystem information that is associated with each of the plurality of hardware subsystems and that describes at least a portion of a communication route between that hardware subsystem and at least one other hardware subsystem;
   combine the respective hardware subsystem information that is associated with each of the plurality of hardware subsystems to generate configuration information that describes complete communication routes that include physical connections between each of the plurality of hardware subsystems and that are determined based on the respective hardware subsystem information; and
   configure at least one of the plurality of hardware subsystems using the configuration information.

2. The system of claim 1, wherein the retrieving the respective hardware subsystem information that is associated with each of the plurality of hardware subsystems includes:
   retrieving, in the communications with at least one of the plurality of hardware subsystems, the respective hardware subsystem information that is associated with the at least one of the plurality of hardware subsystems and that is self-reported by the at least one of the plurality of hardware subsystems.

3. The system of claim 1, wherein the retrieving the respective hardware subsystem information that is associated with each of the plurality of hardware subsystems includes:
   receiving, in the communications with at least one of the plurality of hardware subsystems, an identification of the at least one of the plurality of hardware subsystems; and
   retrieving, from a database using the identification of the at least one of the plurality of hardware subsystems, the respective hardware subsystem information that is associated with the at least one of the plurality of hardware subsystems.

4. The system of claim 1, wherein the plurality of hardware subsystems include a processing subsystem, and wherein the configuration information includes a processing subsystem initialization table that is used to configure the processing subsystem.

5. The system of claim 4, wherein the plurality of hardware subsystems include a device, and wherein the configuration information includes a complete communication route between the processing subsystem and the device.

6. The system of claim 5, wherein the plurality of hardware subsystems include a planar subsystem, and wherein the configuration information includes the complete communication route between the processing subsystem and the device via the planar subsystem.

7. An Information Handling System (IHS), comprising:
   a Basic Input Output System (BIOS) processing system; and
   a BIOS memory system that is coupled to the BIOS processing system and that includes instructions that, when executed by the BIOS processing system, cause the BIOS processing system to provide a BIOS engine that is configured, during initialization operations, to:
   communicate with each of a plurality of hardware subsystems;
   retrieve, in response to the communications with each of the plurality of hardware subsystems, respective hardware subsystem information that is associated with each of the plurality of hardware subsystems and that describes at least a portion of a communication route between that hardware subsystem and at least one other hardware subsystem;
   combine the respective hardware subsystem information that is associated with each of the plurality of hardware subsystems to generate configuration information that describes complete communication routes that include physical connections between each of the plurality of hardware subsystems and that are determined based on the respective hardware subsystem information; and
   configure at least one of the plurality of hardware subsystems using the configuration information.

8. The IHS of claim 7, wherein the retrieving the respective hardware subsystem information that is associated with each of the plurality of hardware subsystems includes:
   retrieving, in the communications with at least one of the plurality of hardware subsystems, the respective hardware subsystem information that is associated with the at least one of the plurality of hardware subsystems and that is self-reported by the at least one of the plurality of hardware subsystems.

9. The IHS of claim 7, wherein the retrieving the respective hardware subsystem information that is associated with each of the plurality of hardware subsystems includes:
   receiving, in the communications with at least one of the plurality of hardware subsystems, an identification of the at least one of the plurality of hardware subsystems; and
   retrieving, from a database using the identification of the at least one of the plurality of hardware subsystems, the respective hardware subsystem information that is associated with the at least one of the plurality of hardware subsystems.

10. The IHS of claim 7, wherein the plurality of hardware subsystems include a runtime processing subsystem, and wherein the configuration information includes a runtime processing subsystem initialization table that is used to configure the runtime processing subsystem.

11. The IHS of claim 10, wherein the plurality of hardware subsystems include a device, and wherein the configuration information includes a complete communication route between the runtime processing subsystem and the device.

12. The IHS of claim 11, wherein the plurality of hardware subsystems include a planar subsystem, and wherein the configuration information includes the complete communication route between the runtime processing subsystem and the device via the planar subsystem.

13. The IHS of claim 7, wherein BIOS engine is configured to:
   convert the configuration information into a conventional configuration table for use in configuring the at least one of the plurality of hardware subsystems.

14. A method for BIOS platform configuration, comprising:
   communicating, by a Basic Input Output System (BIOS), with each of a plurality of hardware subsystems;
   retrieving, by the BIOS in response to the communications with each of the plurality of hardware subsystems, respective hardware subsystem information that is associated with each of the plurality of hardware subsystems and that describes at least a portion of a communication route between that hardware subsystem and at least one other hardware subsystem;
   combining, by the BIOS, the respective hardware subsystem information that is associated with each of the plurality of hardware subsystems to generate configuration information that describes complete communication routes that include physical connections between each of the plurality of hardware subsystems and that are determined based on the respective hardware subsystem information; and
   configuring, by the BIOS, at least one of the plurality of hardware subsystems using the configuration information.

15. The method of claim 14, wherein the retrieving the respective hardware subsystem information that is associated with each of the plurality of hardware subsystems includes:
   retrieving, in the communications with at least one of the plurality of hardware subsystems, the respective hardware subsystem information that is associated with the at least one of the plurality of hardware subsystems and that is self-reported by the at least one of the plurality of hardware subsystems.

16. The method of claim 14, wherein the retrieving the respective hardware subsystem information that is associated with each of the plurality of hardware subsystems includes:
   receiving, in the communications with at least one of the plurality of hardware subsystems, an identification of the at least one of the plurality of hardware subsystems; and
   retrieving, from a database using the identification of the at least one of the plurality of hardware subsystems, the respective hardware subsystem information that is associated with the at least one of the plurality of hardware subsystems.

17. The method of claim 14, wherein the plurality of hardware subsystems include a processing subsystem, and wherein the configuration information includes a processing subsystem initialization table that is used to configure the processing subsystem.

18. The method of claim 17, wherein the plurality of hardware subsystems include a device, and wherein the configuration information includes a complete communication route between the processing subsystem and the device.

19. The method of claim 18, wherein the plurality of hardware subsystems include a planar subsystem, and wherein the configuration information includes the complete communication route between the processing subsystem and the device via the planar subsystem.

20. The method of claim 14, further comprising:
   converting, by the BIOS, the configuration information into a conventional configuration table for use in configuring the at least one of the plurality of hardware subsystems.

* * * * *